United States Patent
Kobayashi (10) Patent No.: US 7,478,701 B2
(45) Date of Patent: Jan. 20, 2009

(54) MANUFACTURING METHOD OF SUPPORTING STRUCTURE FOR VEHICLE

(75) Inventor: Naoki Kobayashi, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 330 days.

(21) Appl. No.: 11/549,415

(22) Filed: Oct. 13, 2006

(65) Prior Publication Data

US 2007/0107970 A1    May 17, 2007

(30) Foreign Application Priority Data

Oct. 17, 2005    (JP)    ............... P.2005-301922

(51) Int. Cl.
*B60K 1/00* (2006.01)

(52) U.S. Cl. .................. 180/299; 180/902; 180/300
(58) Field of Classification Search ................ 180/291, 180/299, 300, 312, 902
See application file for complete search history.

(56) References Cited

U.S. PATENT DOCUMENTS

| | | | | |
|---|---|---|---|---|
| 4,679,777 A | * | 7/1987 | Gold et al. | ............. 267/140.13 |
| 5,722,631 A | * | 3/1998 | Dorton | ........................ 248/635 |
| 5,947,226 A | * | 9/1999 | Bellamy et al. | ............. 180/299 |
| 6,053,487 A | * | 4/2000 | Yotani et al. | ........... 267/140.11 |
| 7,111,705 B2 | * | 9/2006 | Ohta et al. | ................... 180/312 |

FOREIGN PATENT DOCUMENTS

| | | |
|---|---|---|
| JP | 2002-2310 | 1/2002 |
| JP | 2002-127762 | 5/2002 |

* cited by examiner

*Primary Examiner*—Christopher P Ellis
*Assistant Examiner*—Bridget Avery
(74) *Attorney, Agent, or Firm*—Greenblum & Bernstein, P.L.C.

(57) ABSTRACT

A manufacturing method of a supporting structure for vehicle has steps of preparing a casting mold having: a first and a second casting mold, which are matched to each other at casting, and has forming faces which form at least sides of first and second fixing portions and the connecting portion and a third casting mold having a forming face which forms a fixing face of the second fixing portion and a protruding body which forms a recess hole penetrating to an interior of the connecting portion from the fixing face of the second fixing portion; matching the third casting mold together with the first and the second casting mold so as to form a cavity for integrally forming the first fixing portion, the second fixing portion and the connecting portion in the casting mold; and pouring molten metal into the cavity so as to mold the supporting structure.

5 Claims, 5 Drawing Sheets

FIG. 1A

LOADING DIRECTION

FIG. 5B

MANUFACTURING METHOD OF SUPPORTING STRUCTURE FOR VEHICLE

CROSS-REFERENCE TO RELATED APPLICATIONS

This application claims priority under 35 U.S. § 119 to application Ser. No. JP2005301922 filed on Oct. 17, 2005, the contents of which are incorporated by reference in their entirety.

BACKGROUND OF THE INVENTION

1. Field of the Invention

The present invention relates to a manufacturing method of a supporting structure for vehicle. More particularly, the present invention relates to a manufacturing method of a supporting structure for vehicle characterized in that the supporting structure itself is plastically deformed when a load not less than a setting load is given to the supporting structure so that an impact force impressed upon the supporting structure can be relaxed.

2. Description of Related Art

In a supporting structure for supporting and fixing an engine, transmission, differential gear and so forth, a mechanism is provided which absorbs and relaxes impact energy by the plastic deformation of the supporting structure itself when a load not less than a predetermined value is given by a collision to an object to be supported such as an engine attached to the supporting structure.

For example, Japanese Patent Unexamined Publication JP-A-2002-2310 discloses a bracket used for supporting a power plant which includes a flange portion, on the side of which a notch groove having a V-shaped cross section is formed, and when a load not less than a predetermined value is given, the flange portion is broken from a starting point of the notch groove so that an impact force given to the bracket can be relaxed.

Japanese Patent Unexamined Publication JP-A-2002-127762 discloses an engine mount having a notch portion which becomes a starting point of the plastic deformation or destruction when a load not less than a predetermined value is given to the engine supporting structure.

A supporting structure, which absorbs and relaxes impact energy by the plastic deformation of the supporting structure when a load not less than a predetermined value is given to an object to be supported such as an engine, transmission and differential gear, is formed into various shapes according to a type of the object to be supported and an attaching position. Further, the proof stress, at which the plastic deformation of the supporting structure is made, is variously changed. Concerning the method of forming such various supporting structures and portions which allow the supporting structures to be plastically deformed, when machining such as cutting is employed, the machining work becomes complicated and the manufacturing cost is raised.

SUMMARY OF THE INVENTION

It is an object of the present invention to provide a manufacturing method of a supporting structure for vehicle characterized in that it is possible to inexpensively manufacture a supporting structure for absorbing and relaxing impact energy given to an object to be supported when the supporting structure itself is allowed to be deformed, and the supporting structure for vehicle can be surely plastically deformed when a predetermined setting load is given to the supporting structure so that impact energy acting on the object to be supported can be accurately absorbed and relaxed.

In order to accomplish the above object, the present invention has the following constitution.

The present invention provides a manufacturing method of a supporting structure for vehicle, the supporting structure for vehicle including:

a first fixing portion to which an object to be supported is fixed;

a second fixing portion which is fixed to a vehicle body; and a connecting portion for connecting the first fixing portion with the second fixing portion, wherein when a load not less than a predetermined value is given to the object to be supported, the connecting portion is plastically deformed by the load, the manufacturing method comprising:

preparing a casting mold comprising:

a first and a second casting mold, which are matched to each other at the time of casting, and comprises forming faces which form at least sides of the first fixing portion, the second fixing portion and the connecting portion; and a third casting mold comprising:

a forming face which forms a fixing face of the second fixing portion; and a protruding body which forms a recess hole penetrating to an interior of the connecting portion from the fixing face of the second fixing portion;

matching the third casting mold together with the first and the second casting mold so as to form a cavity for integrally forming the first fixing portion, the second fixing portion and the connecting portion in the casting mold; and pouring molten metal into the cavity so as to mold the supporting structure.

Further, in the manufacturing method of the supporting structure for vehicle, by using the casting mold in which:

the first fixing portion of the supporting structure is formed so that a longitudinal direction of the first fixing portion agrees with a direction in which the load acts on the object to be supported; and the first casting mold and the second casting mold are used in such a manner that a face direction of matching the first casting mold and the second casting mold is parallel with the longitudinal direction of the first fixing portion, the supporting structure can be manufactured with the casting mold which can be simply manufactured.

Furthermore, in the manufacturing method of the supporting structure for vehicle, by using the casting mold in which:

in the first and the second casting molds, the forming face, which forms the connecting portion and is provided at least one of the first and second casting molds, is formed such that:

an interval between the forming faces which forms a side portion of the connecting portion, of which face direction is perpendicular to a loading direction, is smaller than an interval between the forming faces which forms a side portion of the connecting portion, of which face direction is parallel to the loading direction, it becomes easy to manufacture a supporting structure which can be easily plastically deformed in the loading direction.

Further, in the manufacturing method of the supporting structure for vehicle, by using the casing molds in which:

in the first and the second casting molds, among the forming faces which forms the connecting portion provided at least one of the first and second casting molds, on the forming face which forms a side portion of which face direction is perpendicular to the loading direction, a protrusion which forms a groove on an outer face of the side portion is provided, it is possible to manufacture a supporting structure, the proof stress, at which the connecting portion is plastically deformed, can be appropriately adjusted.

Furthermore, in the manufacturing method of a supporting structure for vehicle, by using the casting mold in which:

in the first and the second casting molds, among the forming faces which forms the connecting portion provided at least one of the first and second casting molds, on the forming face which forms a side portion of which face direction is parallel to the loading direction, a protrusion which forms a recessed portion on an outer face of the side portion is provided, it is possible to manufacture a supporting structure by appropriately adjusting the proof stress, at which the connecting portion is plastically deformed, when the cross-sectional shape of the connecting portion or the wall thickness of the connecting portion is appropriately.

According to the manufacturing method of a supporting structure for vehicle of the present invention, the supporting structure having the first fixing portion, the second fixing portion and the connecting portion is manufactured by a casting method in which a casting mold is used. Therefore, the supporting structure can be easily manufactured by appropriately making a design so that the connecting portion of the supporting structure can be plastically deformed when a load is given to it. When the third casting mold is provided with a protruding body for lightening the inside of the connecting portion, it is possible to manufacture a supporting structure in which the proof stress of the connecting portion, at which the connecting portion is plastically deformed, can be appropriately set.

DETAILED DESCRIPTION OF THE PREFERRED EMBODIMENTS

Referring to the accompanying drawings, the preferred embodiments of the present invention will be explained in detail as follows.

First Embodiment

Figure 1A:
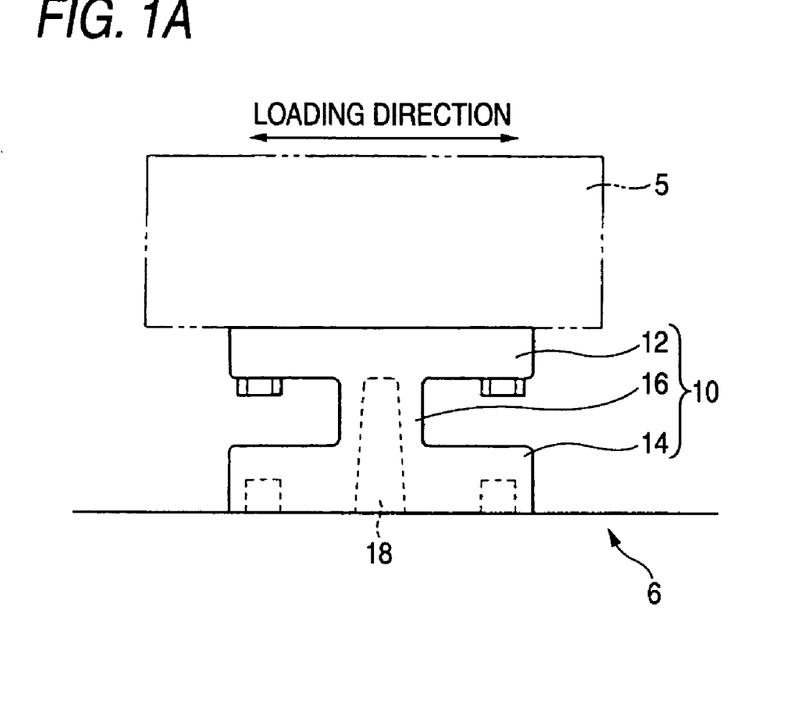
FIGS. 1A and 1B are schematic illustrations showing a constitution and action of a supporting structure for vehicle.
Figure 1B:
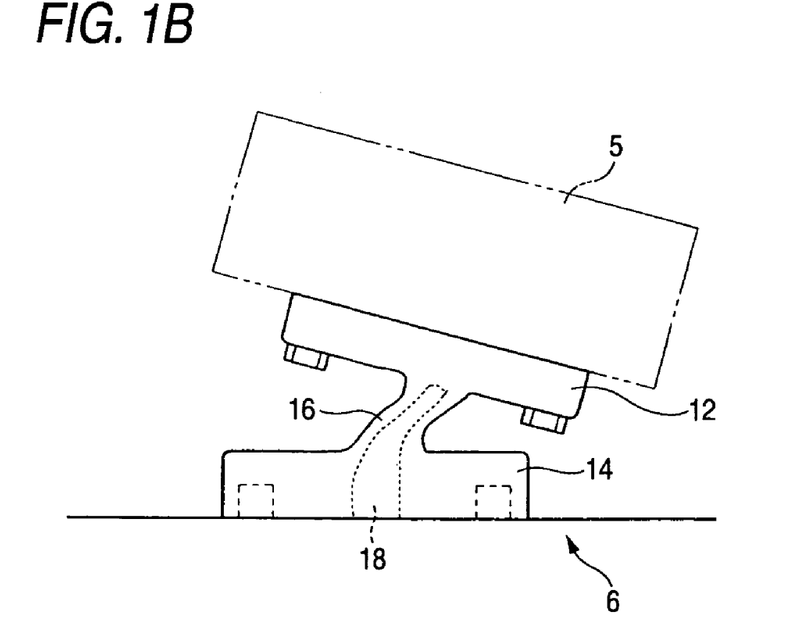

FIG. 1 is a view showing an example of a supporting structure for vehicle manufactured by the method of the present invention. In this view, an action of the supporting structure for vehicle is also shown. In the view, a supporting structure 10 includes: a first fixing portion 12 to which an object to be supported is fixed; a second fixing portion 14 fixed to a support portion 6 provided on the vehicle side; and a connecting portion 16 for integrally connecting the first fixing portion 12 with the second fixing portion 14. From a fixing face of the second fixing portion 14 to the connecting portion 16, a recess hole 18, which is open on the fixing face, is provided. Therefore, since a thin wall thickness portion is formed in the connecting portion 16, when a load of not less than a predetermined value is given to the object to be supported, the connecting portion 16 is plastically deformed and an impact can be absorbed.

In FIG. 1A, a loading direction of the object 5 to be supported is shown by an arrow. A first fixing portion 12 of the supporting structure 10 is fixed to the object 5 to be supported so that the longitudinal direction of the first fixing portion 12 can agree with the loading direction of the object 5 to be supported. According to the state of collision of a vehicle, a load can be given to the object to be supported in various directions. For example, the loading direction shown in FIG. 1A is estimated to be a loading direction in the case where a vehicle comes to a head-on collision with another one.

FIG. 1A shows a usual state in which the object 5 to be supported is supported by the supporting structure 10. FIG. 1B shows a state in which the object 5 to be supported is given a load not less than a setting value and the supporting structure 10 is plastically deformed as if it fell down in the loading direction. When the supporting structure 10 is plastically deformed, impact energy acting on the object 5 to be supported can be absorbed.

Figure 2A:
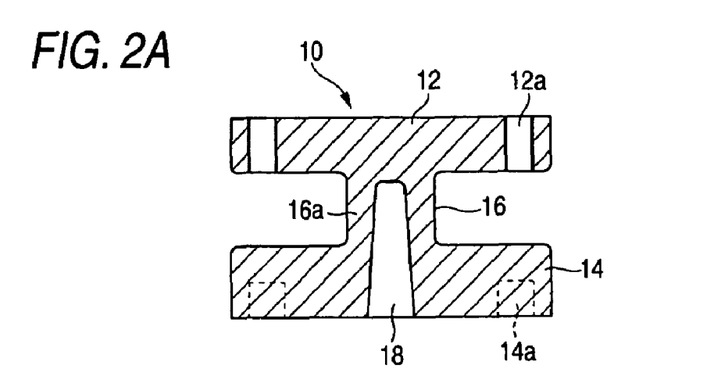
FIGS. 2A and 2B are sectional views showing a supporting structure for vehicle.
Figure 2B:
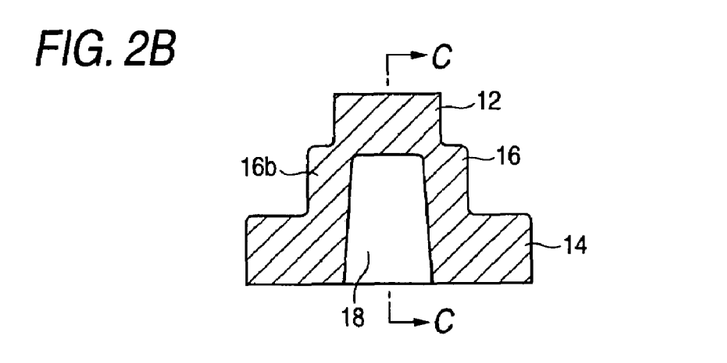
Figure 2C:
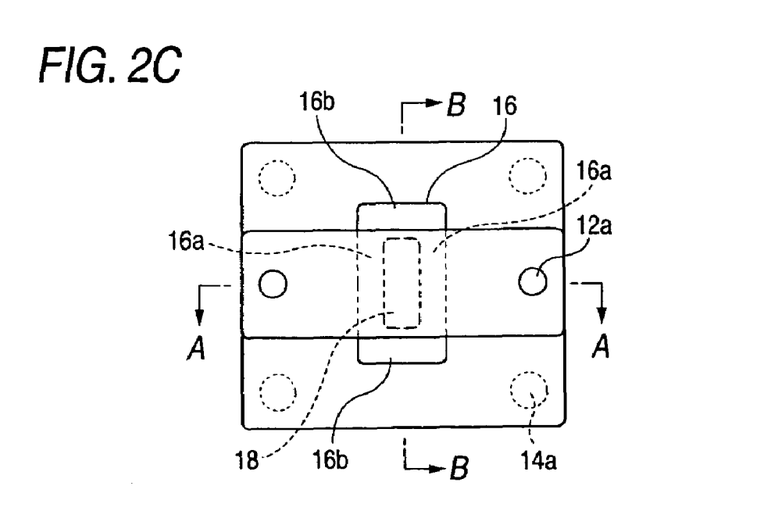
FIG. 2C is a plan view showing a supporting structure for vehicle.

FIGS. 2A and 2B are sectional views showing the supporting structure 10 illustrated in FIG. 1. FIG. 2c is a plan view showing the supporting structure 10 illustrated in FIG. 1. FIG. 2A is a sectional view taken on line A-A in FIG. 2C (plan view). FIG. 2B is a sectional view taken on line B-B in FIG. 2C. As shown in FIG. 2A, a front shape of the supporting structure 10 is formed into an H-shape. As shown in FIG. 2B, a side shape of the supporting structure 10 is formed into a step-shape, the width of which is gradually increased from the first fixing portion 12 to the second fixing portion 14.

As shown in FIG. 2C (Concerning the connecting portion 16, a cross-section is shown in FIG. 2C.), a plan shape of the supporting structure 10 is formed in such a manner that the first fixing portion 12 is formed into a rectangle and the second fixing portion 14 is formed into a square, the length of one side of which is equal to the length in the longitudinal direction of the first fixing portion 12. The connecting portion 16 to connect the first fixing portion 12 with the second fixing portion 14 is formed into a constricted shape which is constricted in the longitudinal direction of the first fixing portion 12. The connecting portion 16 is a little protruded in the width direction of the first fixing portion 12 as compared with the width of the first fixing portion 12.

A recess hole 18, which is formed in the second fixing portion 14 and the connecting portion 16, is open onto the fixing face side of the second fixing portion 14 and formed into a shape which extends to a portion close to the connecting portion of the connecting portion 16 with the first fixing portion 12. In the present embodiment, an inner face shape of the recess hole 18 is formed so that the wall thickness of the side portion 16a (shown in FIG. 2A) of the connecting portion 16 perpendicular to the longitudinal direction of the first fixing portion 12 can be smaller than the wall thickness of the side portion 16b (shown in FIG. 2B) parallel to the longitudinal direction of the first fixing portion 12. In this connection, the side portion 16a perpendicular to the longitudinal direction of the first fixing portion 12 of the connecting portion 16 is a pair of side portions of the connecting portion 16, the face directions of the outside of which are perpendicular to the longitudinal direction of the first fixing portion 12. The side portion 16b parallel with the longitudinal direction of the first fixing portion 12 of the connecting portion 16 is a pair of side portions, the face directions of the outside of which are parallel to the longitudinal direction of the first fixing portion 12.

At both end portions in the longitudinal direction of the first fixing portion 12, bolt insertion holes 12a are formed which are used for connecting the first fixing portion 12 with the object 5 to be supported. In the second fixing portion 14, screw holes 14a are formed which are used for fixing the second fixing portion 14 to the support portion 6 provided on the vehicle side by fixing screws.

In this connection, instead of providing the bolt insertion holes 12a in the first fixing portion 12, screw holes for fixing the object 5 to be supported by fixing screws may be provided. Instead of providing the screw holes 14a in the second fixing portion 14, bolt insertion holes may be provided.

Manufacturing Method of Supporting Structure

Figure 3A:
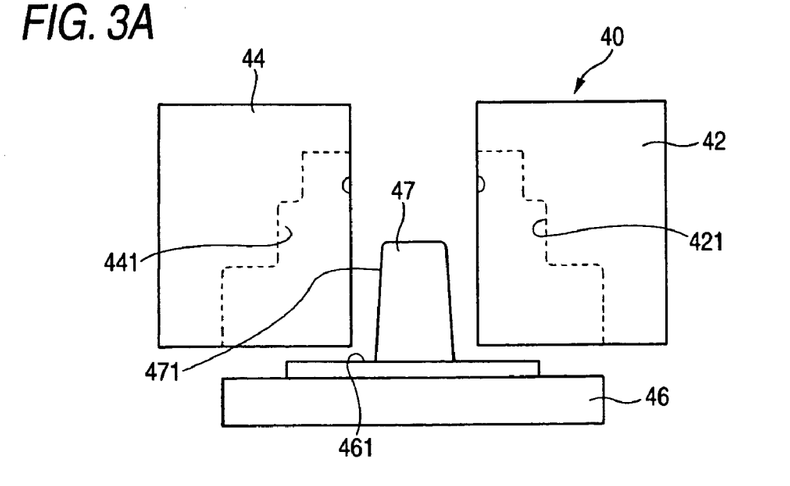
FIGS. 3A to 3C are sectional views showing a constitution of a casting mold used for manufacturing a supporting structure for vehicle of the first embodiment.

FIG. 3A is a view showing a casting mold 40 used in the case of manufacturing the above supporting structure 10 by means of casting. The casting mold 40 includes: a first casting mold 42 and a second casting mold 44 which are used for forming the first fixing portion 12, the second fixing portion 14 and the connecting portion 16; and a third casing mold 46 which is used for forming a fixing face and a recess hole 18 of the second fixing portion 14. FIG. 3A is a view showing a state in which the first casting mold 42, the second casting mold 44 and the third casting mold 46 are matched to each other.

The first casting mold 42 and the second casting mold 44 are formed to be a pair of split molds in which a face passing through the center line position in the width direction of the first fixing portion 12 and also passing through the center line position (position of line C-C in FIG. 2B) of the second fixing portion 14 is made to be a mold matching face. In the first casting mold 42 and the second casting mold 44, forming faces 421, 441 are formed which are used for forming outer faces of the first fixing portion 12, the second fixing portion 14 and the connecting portion 16. In the third casting mold 46, a forming face 461 for forming the fixing face of the second fixing portion 14 and a protruding body 47 for forming the recess hole 18 are formed.

Figure 3B:
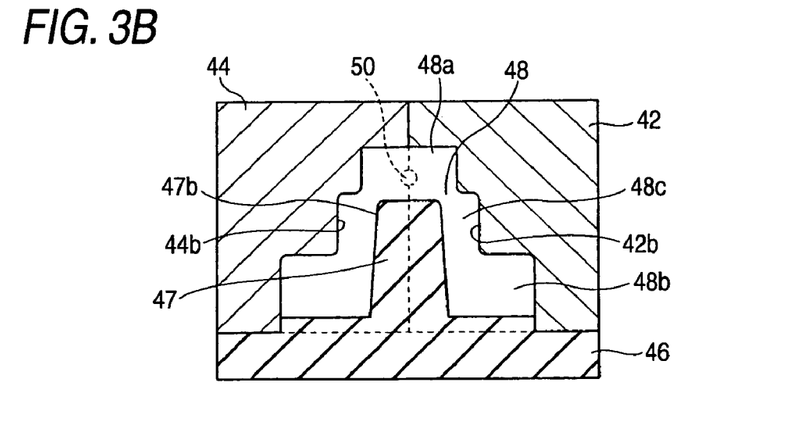
Figure 3C:
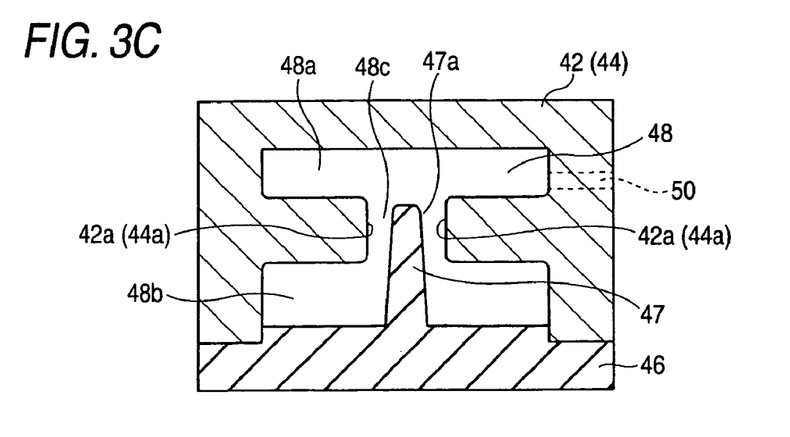

FIGS. 3B and 3C are views showing a state in which the first casting mold 42, the second casting mold 44 and the third casting mold 46 are matched to each other and a cavity 48 is formed. FIG. 3B is a sectional view taken in a direction perpendicular to the mold matching face of the first casting mold 42 and the second casting mold 44. FIG. 3C is a sectional view taken in a direction parallel to the mold matching face. FIG. 3C is a view showing the first casting mold 42. Concerning the second casting mold 44, the cavity is formed in the same manner as that of the first casting mold 42.

The cavity 48 includes forming portions 48a, 48b, 48c by which the first fixing portion 12, the second fixing portion 14 and the connecting portion 16 are formed. The forming portions 48a, 48b, 48c are formed into inner spaces, which are communicated with each other in the casting mold, by the forming faces 421, 441 provided in the first casting mold 42 and the second casting mold 44 and by the forming face 461 provided in the third casting mold 46 and by the forming face 471 which is an outer face of the protruding body 47. An end face on the protruding side of the protruding body 47 extends to a portion close to the boundary between the forming portions 48a and 48c.

A shown in FIG. 3C, a forming portion for forming the side portion 16a, the face direction of which is perpendicular to the longitudinal direction of the first fixing portion 12 of the connecting portion 16, includes: a forming face 42a (44a), which is formed in the first casting mold 42 and the second casting mold 44, for forming an outside of the connecting portion 16; and a forming face 47a of the protruding body 47 opposed to the forming face 42a (44a).

As shown in FIG. 3B, a forming portion for forming the side portion 16b, the face direction of which is parallel with the longitudinal direction of the first fixing portion 12 of the connecting portion 16, includes: a forming face 42b, 44b for forming the outside of the connecting portion 16 formed in the first casting mold 42 and the second casting mold 44; and a forming face 47b of the protruding body 47 opposed to the forming face 42b, 44b.

In the present embodiment, the first casting mold 42, the second casting mold 44 and the third casting mold 46 are matched to each other. Then, molten metal is poured from the gate 50 into the cavity 48 by the gravity casting method (GDC). In this way, the supporting structure 10 is manufactured by means of casting. A casting manufactured by the above casting mold 40 is composed in such a manner that the first fixing portion 12, the second fixing portion 14 and the connecting portion 16 are formed being integrated with each other into one body and the recess hole 18 is formed in a portion located from the second fixing portion 14 to the connecting portion 16. When an insertion hole 12a is formed in the first fixing portion 12 of the this obtained casting by means of machining and a screw hole 14a is formed in the second fixing portion 14 by means of machining, the supporting structure 10 shown in FIGS. 1 and 2 can be obtained.

The thus obtained supporting structure 10 is composed so that the connecting portion 16 can be plastically deformed in the loading direction when the object 5 to be supported, which is supported by the supporting structure 10, is given a load not less than a setting value in the loading direction shown in FIG. 1. When the connecting portion 16 is plastically deformed as described above, it is possible to absorb and relax an intensity of impact energy.

The connecting portion 16 is formed into a shape which is constricted in the longitudinal direction of the first fixing portion 12, that is in the loading direction. Further, the recess hole 18 is formed in a portion located from the second fixing portion 14 to the connecting portion 16. Furthermore, the wall thickness of the side portion 16a perpendicular to the longitudinal direction of the first fixing portion 12 of the connecting portion 16 is smaller than the wall thickness of the side portion 16b parallel to the longitudinal direction of the first fixing portion 12. Due to the above structure, when a load is given in the longitudinal direction of the first fixing portion 12, the connecting portion 16 can be easily plastically deformed.

According to the manufacturing method of a supporting structure of the present embodiment in which the supporting structure 10 is manufactured by means of casting, a form of the connecting portion 16 which is deformed when the supporting structure 10 is given a load, for example, a distance between the side portions 16a, 16b which are opposed to each other can be appropriately set by changing shapes of the forming faces 421, 441 of the first casting mold 42 and the second casting mold 44. Further, the wall thickness of the side portion 16a, 16b of the connecting portion 16 can be appropriately set by changing an amount of protrusion and a shape of the protruding body 47 formed by the forming faces 421, 441 of the first casting mold 42 and the second casting mold 44 and by the third casting mold 46.

When the recess hole 18 is formed in the connecting portion 18 from the second fixing portion 14, a weight of the supporting structure 10 can be reduced. Further, the proof stress of the supporting structure 10, at which the plastic deformation is caused, can be adjusted.

When the casting method is employed, an external appearance of the connecting portion can be appropriately formed and further it is possible to easily form a recess hole which is difficult to be formed by means of machining. Furthermore, a shape of the recess hole 18 can be appropriately formed by changing an amount of protrusion and a shape of the protruding body 47 formed in the third casting mold 46. That is, when the width of the protruding body 47 is increased or decreased, the wall thickness of the side portion 16a, 16b of the connecting portion 16 can be increased or decreased. When the length of protrusion of the protruding body 47 is extended or reduced, the wall thickness and the inside shape of the connecting portion 16 can be changed. Accordingly, the proof stress of the connecting portion 16, at which the connecting portion 16 is plastically deformed when a load is given to the connecting portion, can be appropriately adjusted.

In this connection, in the present embodiment, a matching face on which the first casting mold 42 and the second casting mold 44 are matched to each other is set to be parallel with the longitudinal direction of the first fixing portion 12. However, the supporting structure 10 of the present embodiment is formed to be symmetrical with respect to the direction perpendicular to the longitudinal direction of the first fixing portion 12. Therefore, the casting mold can be formed out of a split mold, the mold matching face of which is in a direction perpendicular to the longitudinal direction of the first fixing portion 12. However, in this case, the split mold must be deeply engraved. Therefore, it becomes a little difficult to manufacture the casting mold. As described above, depending upon the form of the supporting structure, a mold matching face of the casting mold can be appropriately selected.

Second Embodiment

Figure 4A:
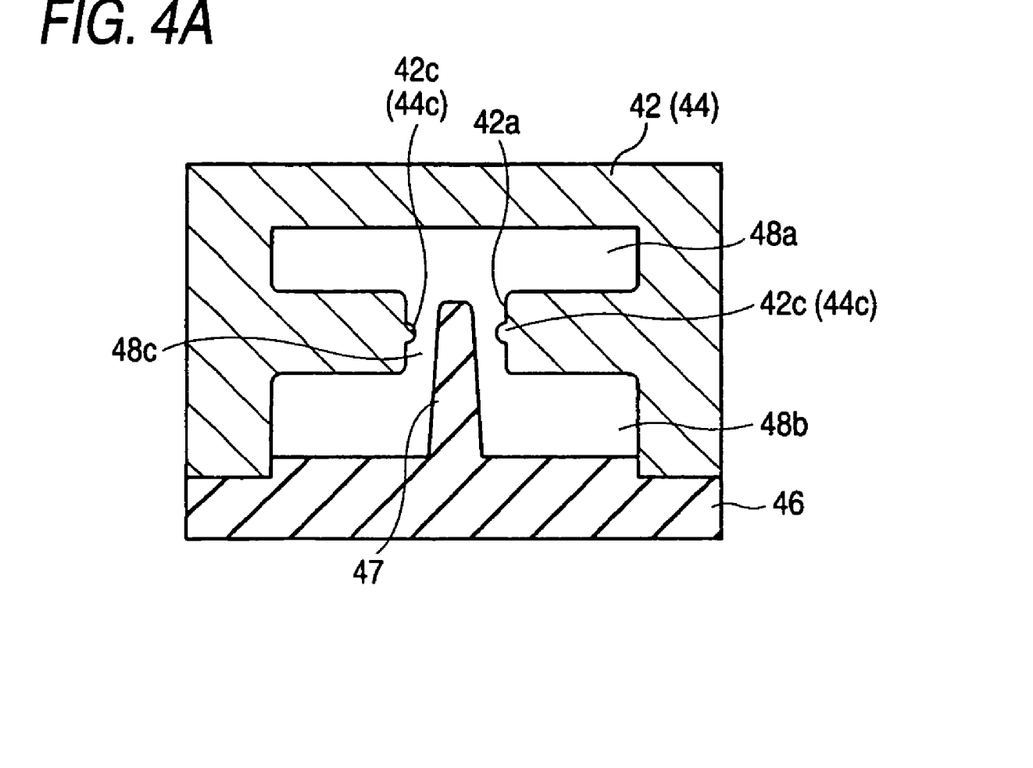
FIG. 4A is a sectional view showing a constitution of a casting mold used for manufacturing a supporting structure for vehicle of the second embodiment.

FIG. 4A is a view showing a casting mold used for the second embodiment of the manufacturing method of the supporting structure 10. In the same manner as that of the first embodiment, the casting mold 40 of the present embodiment is formed out of three casting mold including: a first casting mold 42 and a second casting mold 44 for forming the first fixing portion 12, the second fixing portion 14 and the connecting portion 16; and a third casting mold 46 for forming a fixing face and a recess hole 18 of the second fixing portion 14.

The present embodiment is characterized in that a groove 16c is formed on the outside of the side portion 16a perpendicular to the longitudinal direction of the first fixing portion 12 of the connecting portion 16 at the time of casting the supporting structure 10 with the casting mold.

FIG. 4A is a view showing a state in which a protrusion 42c, which is longitudinally arranged in the width direction of the side portion 16a, is provided on the forming face 42a for forming an outside of the side portion 16a of the connecting portion 16 formed in the first casting mold 42. Concerning the second casting mold 44, in the same manner as that of the protrusion 42c of the first casting mold 42, a protrusion 44c, which is longitudinally arranged in the width direction of the side portion 16a, is provided.

Figure 4B:
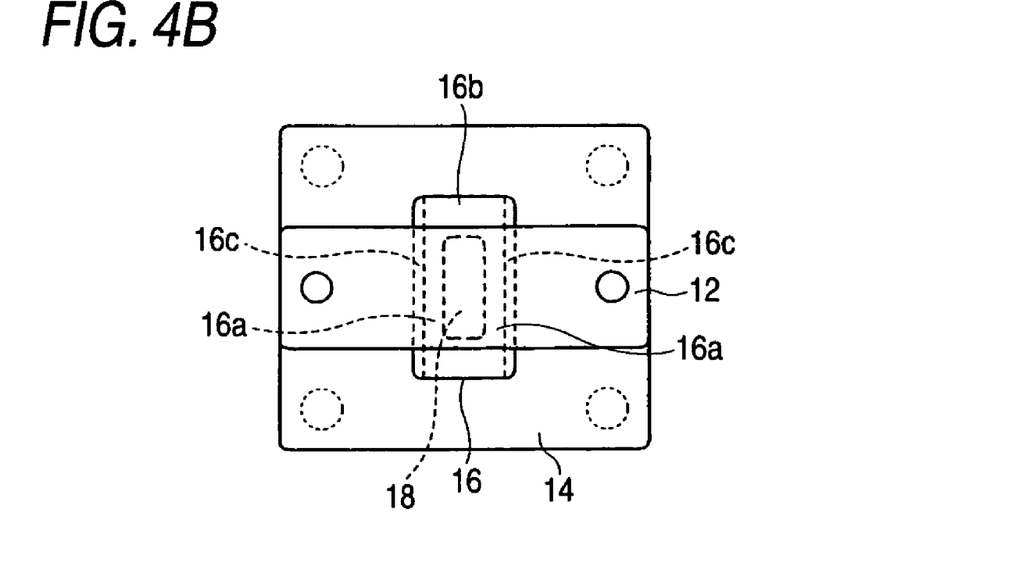
FIG. 4B is a plan view showing a constitution of a casting mold used for manufacturing a supporting structure for vehicle of the second embodiment.

FIG. 4B is a plan view (Concerning the connecting portion 16, a cross section is shown.) of the supporting structure 10 obtained by means of casting in which the first casting mold 42 and the second casting mold 44, having the protrusions 42c, 44c, and the third casting mold 46 having the protruding body 47 are used. When casting is conducted with the first casting mold 42 and the second casting mold 44 having the protrusions 42c, 44c, it is possible to obtain a supporting structure in which the groove 16c is formed on the side portion 16a, 16a perpendicular to the longitudinal direction of the first fixing portion 12 of the connecting portion 16.

In the supporting structure 10, on the outside of the connecting portion 16 of which the groove 16c is formed, the wall thickness of the side portion 16a of the connecting portion 16 is partially reduced in a portion in which the groove 16c is formed. Therefore, when an object to be supported is given a load, the load concentrates upon a portion of the connecting portion 16 in which the groove 16c is formed. Accordingly, the proof stress, at which plastic deformation of the supporting portion 16 is made, can be reduced as compared with a case in which the groove 16c is not formed.

When machining is conducted on a casting, it is possible to form the groove 16c in the connecting portion 16. However, according to the method in which the groove 16c is formed simultaneously when the supporting structure 10 is formed by casting with the casting mold 40, the supporting structure 10, in the connecting portion 16 of which the groove 16c is formed, can be simply manufactured.

In the present embodiment, an example is shown in which one groove 16c is formed in the connecting portion 16. However, it is possible to form a plurality of grooves 16c in the connecting portion 16. Further, it is possible to appropriately adjust the width and depth of the groove 16c. A form of the groove 16c can be appropriately set by changing the form of the protrusion 42c, 44c manufactured in the casting mold. As long as it is a method of manufacturing a supporting structure by means of casting, it is easy to manufacture a supporting structure 10 provided with a connecting portion 16, the form of which is appropriately determined. It is possible to manufacture the supporting structure 10, the proof stress, at which the connecting portion 16 is plastically deformed, of which is appropriately adjusted.

Third Embodiment

Figure 5A:
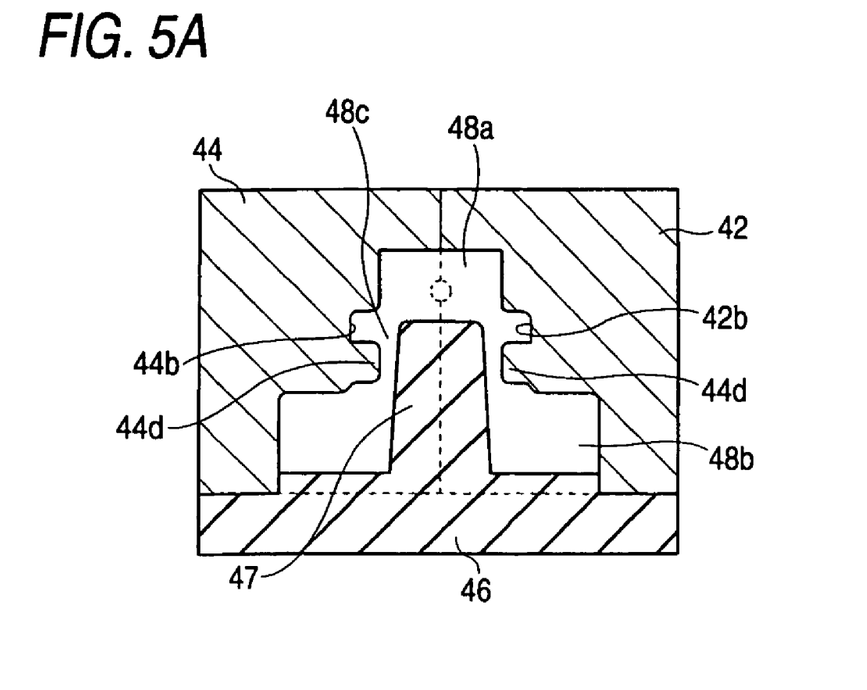
FIG. 5A is a sectional view showing a constitution of a casting mold used for manufacturing a supporting structure for vehicle of the third embodiment.

FIG. 5A is a view showing a casting mold used for the third embodiment of the manufacturing method of the supporting structure 10. In the same manner as that of the first and the second embodiment, in the present embodiment, the supporting structure 10 is manufactured by means of casting with the first casting mold 42, the second casting mold 44 and the third casting mold 46 described before.

The present embodiment is characterized in that a recess portion 16d is formed on the outside 16b parallel with the longitudinal direction of the first fixing portion 12 of the connecting portion 16 at the time of casting the supporting structure 10 with the casting mold.

FIG. 5A is a view showing a state in which a protruding portion 42d, 44d for forming the recess portion 16d is formed on the forming face 42b, 44b which forms an outside of the side portion 16b of the connecting portion 16 formed in the first casting mold 42 and the second casting mold 44.

Figure 5B:
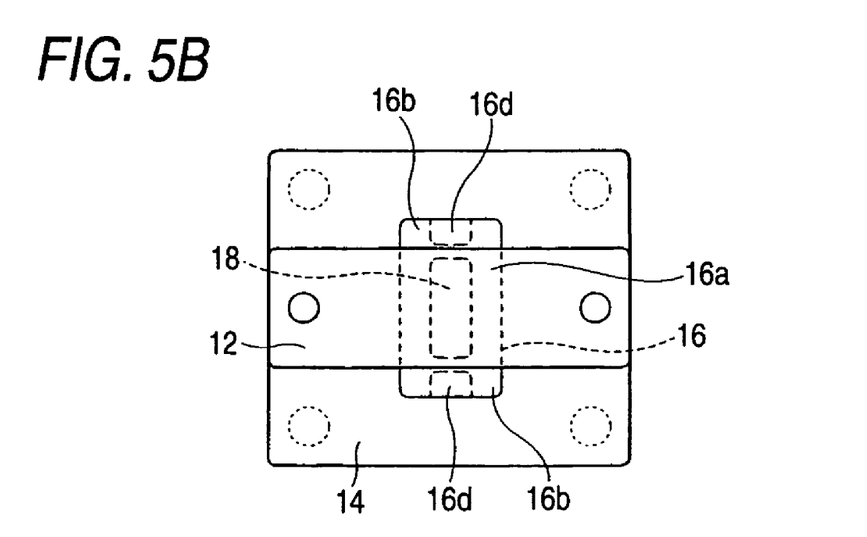
FIG. 5B is a plan view showing a constitution of a casting mold used for manufacturing a supporting structure for vehicle of the third embodiment.

FIG. 5B is a plan view (Concerning the connecting portion 16, a section is shown.) of the supporting structure 10 made by casting with the first casting mold 42 and the second casting mold 44 having the protruding portion 42d, 44d. Since casting is conducted with the first casting mold 42 and the second casting mold 44 having the protruding portion 42d, 44d, it is possible to obtain a supporting structure 10, in the side portion 16b of the connecting portion 16 of which the recess portion 16d is formed.

In the supporting structure 10 in which the recess portion 16d is formed in the side portion 16b which is parallel with the longitudinal direction of the first fixing portion 12, the wall thickness of a portion in the connecting portion 16 in which the recess portion 16d is formed is so small that a cross-sectional area of the connecting portion 16 is reduced. Therefore, the proof stress, at which the connecting portion 16 is plastically deformed when the connecting portion 16 is given a load, can be decreased as compared with a case in which the recess portion 16d is not formed.

Concerning the recess portion 16d formed in the side portion 16b, it is possible to appropriately set the depth and width. Further, it is possible to form a plurality of recess portions 16d. When a form and arrangement of the recess portion 16d formed in the connecting portion 16 are appropriately set as described above, it is possible to adjust the proof stress at which the connecting portion 16 is plastically deformed.

In the case where the recess portion 16d is formed in the side portion 16b of the connecting portion 16, in relation to the recess hole 18 formed inside of the connecting portion 16 by the protruding body 47 provided in the third casting mold 46, when the wall thickness of the connecting portion 16 is adjusted or the cross sectional shape of the connecting portion 16 is adjusted, it is possible to adjust the proof stress at which the connecting portion 16 is plastically deformed.

As described above, the protruding body 47 formed in the third casting mold 46 provides the weakest portion, which is plastically deformed when a load is given to the supporting structure 10, in the connecting portion 16 by reducing the wall thickness of the connecting portion 16. According to a combination of the form of the protruding body 47 provided in the third casting mold 46 and the form of the groove 16c, which is formed on the outer face of the connecting portion 16, or the recess portion 16d, the proof stress, at which the connecting portion 16 is plastically deformed with respect to a load acting on the supporting structure 10, can be variously set.

In the case of employing the manufacturing method in which the supporting structure is manufacture by the casting method, by a combination of the casting mold, it is possible to manufacture various supporting structure 10 in which a form of the connecting portion 16, a form of the first fixing portion 12 and a form of the second fixing portion 14 are varied. That is, according to the manufacturing method of the supporting structure for vehicle of the present invention, when the supporting structure is manufactured by the casting method, it is possible to inexpensively manufacture various products having a function of absorbing and relaxing impact energy, which is necessary for the supporting structure 10, according to the form of the object to be supported by the supporting structure 10 and the attaching position of the object to be supported.

In this connection, the above explanations are made into an example in which the supporting structure 10 is given a load as shown in FIG. 1A. However, even in the case where the loading direction is different from that shown in FIG. 1A, an external appearance of the connecting portion 16 and a cross-sectional shape can be appropriately designed. Therefore, it is possible to manufacture a supporting structure having a function of absorbing a predetermined impact energy.

Concerning the casting method, the common gravity casting method is used in the embodiment described above. However, the casting method is not limited to the gravity casting method. It is possible to use a well known casting method such as a die-casting method (DC), a low pressure casting method (LPD) or a reduction casting method.

What is claimed is:

1. A manufacturing method of a supporting structure for vehicle, the supporting structure for vehicle including:
   a first fixing portion to which an object to be supported is fixed;
   a second fixing portion which is fixed to a vehicle body; and
   a connecting portion for connecting the first fixing portion with the second fixing portion, wherein
   when a load not less than a predetermined value is given to the object to be supported, the connecting portion is plastically deformed by the load,
   the manufacturing method comprising:
   preparing a casting mold comprising:
      a first and a second casting mold, which are matched to each other at the time of casting, and comprises forming faces which form at least sides of the first fixing portion, the second fixing portion and the connecting portion; and
      a third casting mold comprising:
         a forming face which forms a fixing face of the second fixing portion; and
         a protruding body which forms a recess hole penetrating to an interior of the connecting portion from the fixing face of the second fixing portion;
   matching the third casting mold together with the first and the second casting mold so as to form a cavity for integrally forming the first fixing portion, the second fixing portion and the connecting portion in the casting mold; and
   pouring molten metal into the cavity so as to mold the supporting structure.

2. The manufacturing method of the supporting structure for vehicle according to claim 1, wherein
   the first fixing portion of the supporting structure is formed so that a longitudinal direction of the first fixing portion agrees with a direction in which the load acts on the object to be supported, and
   the first casting mold and the second casting mold are used in such a manner that a face direction of matching the first casting mold and the second casting mold is parallel with the longitudinal direction of the first fixing portion.

3. The manufacturing method of the supporting structure for vehicle according to claim 1, wherein
   in the first and the second casting molds, the forming face, which forms the connecting portion and is provided at least one of the first and second casting molds, is formed such that:
   an interval between the forming faces which forms a side portion of the connecting portion, of which face direction is perpendicular to a loading direction, is smaller than an interval between the forming faces which forms a side portion of the connecting portion, of which face direction is parallel to the loading direction.

4. The manufacturing method of the supporting structure for vehicle according to claim 1, wherein
   in the first and the second casting molds, among the forming faces which forms the connecting portion provided at least one of the first and second casting molds, on the forming face which forms a side portion of which face direction is perpendicular to the loading direction, a protrusion which forms a groove on an outer face of the side portion is provided.

5. The manufacturing method of a supporting structure for vehicle according to claim 1, wherein in the first and the second casting molds, among the forming faces which forms the connecting portion provided at least one of the first and second casting molds, on the forming face which forms a side portion of which face direction is parallel to the loading direction, a protrusion which forms a recessed portion on an outer face of the side portion is provided.

* * * * *

UNITED STATES PATENT AND TRADEMARK OFFICE
CERTIFICATE OF CORRECTION

| | |
|---|---|
| PATENT NO. | : 7,478,701 B2 |
| APPLICATION NO. | : 11/549415 |
| DATED | : January 20, 2009 |
| INVENTOR(S) | : N. Kobayashi |

It is certified that error appears in the above-identified patent and that said Letters Patent is hereby corrected as shown below:

On the Title Page at Item (30), Foreign Application Priority Data, "P.2005-301922" should be --2005-301922--.

Signed and Sealed this

Fourteenth Day of April, 2009

JOHN DOLL
*Acting Director of the United States Patent and Trademark Office*